Jan. 10, 1950     A. W. MANDELKO ET AL     2,494,099
RAILWAY CAR JACK
Filed Nov. 22, 1948
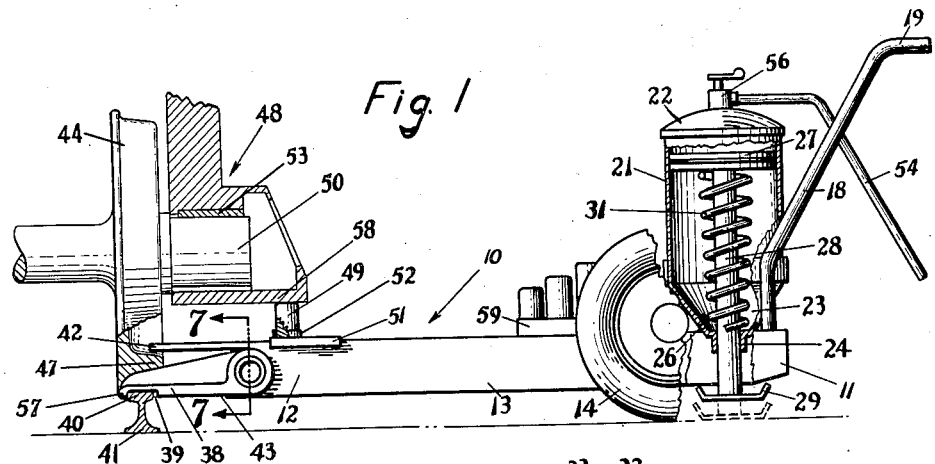
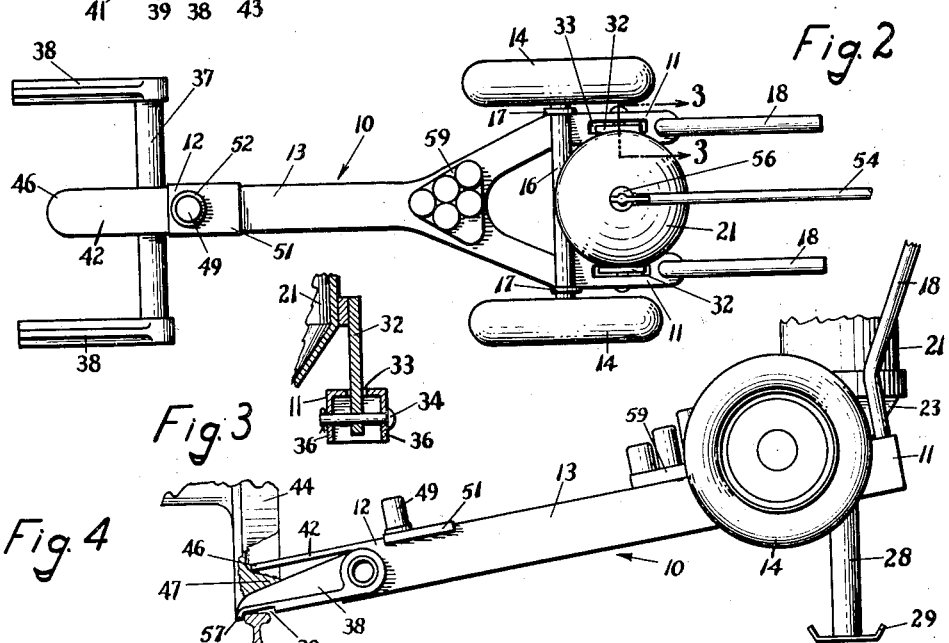
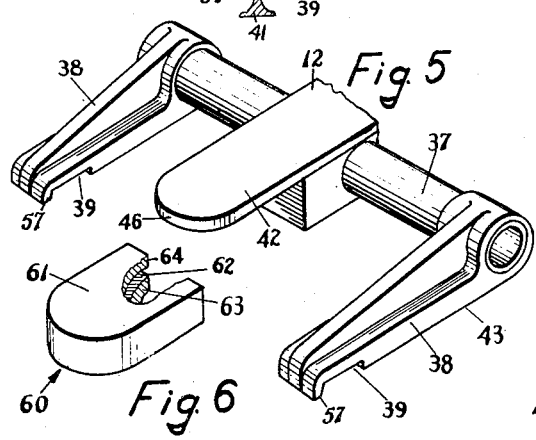
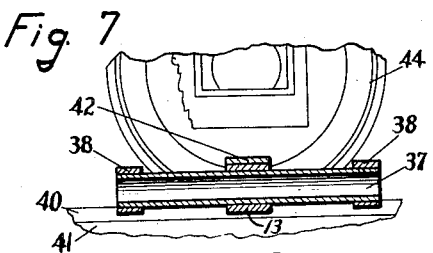
INVENTOR
August W. Mandelko
Melvin A. Mandelko Patented Jan. 10, 1950

2,494,099

UNITED STATES PATENT OFFICE 2,494,099

RAILWAY CAR JACK

August W. Mandelko and Melvin A. Mandelko, Fort Dodge, Iowa

Application November 22, 1948, Serial No. 61,492

5 Claims. (Cl. 254—33)

Our invention relates generally to railway car jacks and in particular to a jack for raising the wheel truck to facilitate the inspection, maintenance and service of wedges and brass.

An object of our invention is to provide an improved railway car jack.

A further object of our invention is to provide a railway car jack of a construction such that the wheel truck is raised relative to the wheel axle with a reduced lifting action, relative to jacks of this type which have come to our attention, so as to speed up the inspection and maintenance of brass and wedges.

Yet another object of our invention is to provide a railway car jack capable of concurrently acting on the wheel and the wheel truck to effect a positive and fast raising of the truck from the wheel axle for the inspection and maintenance of wedges and brass.

A still further object of our invention is to provide a railway car jack of a simple and compact construction, capable of lifting a complete wheel truck, or one end of the truck, and applicable to trucks and wheels having varying clearance relations with the ground.

The principal feature of our invention is found in the provision of a railway car jack having a longitudinal frame formed at its front end with three transversely spaced longitudinal arms, with the center arm being shorter and in a plane above the two outer arms. The outer arms are relatively arranged so as to be positioned at opposite sides of a wheel with their free ends supported on a rail which constitutes a fulcrum about which the frame is moved up and down by a lifting unit carried at its rear end. With the outer arms thus supported, the free end of the center arm is engageable with the top side of that section of a wheel flange at the lower side of the wheel. The frame, at the inner end of the center arm, is provided with a truck engaging member which raises the wheel truck in response to an upward movement of the rear end of the frame, with the center arm, during such upward movement of the frame, acting to hold the wheel against upward movement with the truck.

Further objects, features and advantages of this invention will become apparent from the following description when taken in connection with the accompanying drawings in which:

Fig. 1 is a side elevational view of the railway car jack of our invention, shown in lifting position relative to a wheel truck, and with certain parts broken away to more clearly show its construction;

Fig. 2 is a plan view of our jack;

Fig. 3 is a sectional detail view as seen along the line 3—3 in Fig. 2;

Fig. 4 is a side elevational view of our jack in a raised position;

Fig. 5 is an enlarged fragmentary perspective view of the front end of our jack;

Fig. 6 is a fragmentary perspective view of an adaptor member forming part of our jack; and Fig. 7 is a sectional view taken along the line 7—7 in Fig. 1.

With reference to the drawings the railway car jack of our invention is illustrated in Figs. 1 and 2 as including a longitudinal frame, designated generally as 10, of a substantially Y-shape. For convenience of description the branches or legs 11 of the frame 10 shall be hereinafter referred to as being at the rear end of the frame and the free end 12 of the stem 13 shall be referred to as the front end of the frame.

The jack is of a portable type equipped at a position intermediate the ends of the branches 11 with a pair of ground wheels 14 carried on an axle or shaft 16 which is mounted in upright bearing plates 17 suitably secured, as by welding, to the branches 11. Upright handle members 18, attached at their lower ends to the rear ends of the branches 11, are inclined upwardly and rearwardly and formed at their top ends with hand grips 19. Thus by merely pressing downwardly on the hand grips 19, the front end 12 of the frame 10 is lifted in a clearance relation with the ground, whereby the complete jack is readily transported.

An air cylinder 21 of a relatively large capacity is mounted between the branches 11 at a position rearwardly of the wheel axle 16. The cylinder 21 is closed at its upper end by a cover 22 and has an inverted frustum shaped bottom 23 formed with a piston guide 24 and an air vent 26. A piston 27 disposed within the cylinder 21 is provided with a downwardly extended piston rod 28 which extends through the guide 24 and outwardly from the cylinder bottom 23. The lower end of the piston rod 28 carries a shoe or ground engaging member 29 which is normally held in a spaced relation above the ground by the provision of a coil spring 31 mounted about the piston rod 28 between the piston 27 and the piston guide 24.

The cylinder 21 is supported for pivotal movement longitudinally of the frame 10 by means including a pair of oppositely arranged upright plates 32 (Figs. 2 and 3) secured at their upper ends to the cylinder 21 and having their lower ends extended downwardly through longitudinal slots 33 formed in the top sides of the branches 11. The lower ends of the plates 32 are pivotally supported on pins 34 extended between the side walls 36 of the branches 11, which are of an inverted channel shape in transverse cross section.

Extended across the front end 12 of the frame 10 is a transverse support or frame member 37 of a tubular construction. Arranged at opposite ends of the transverse member 37 and projected forwardly from the front end 12 of the frame 10 are a pair of longitudinal rail engaging arms 38 (Figs. 2 and 5). The bottom side of the free end of each arm 38 is formed with a transverse recess or groove 39 of a size to fit over the ball section 40 of a railroad track 41.

Intermediate the arms 38 and extended forwardly from the transverse member 37 at a position in longitudinal alignment with the stem section 13 of the frame 10 is a wheel engaging member 42 of a flat plate construction. As best appears in Fig. 5 the wheel holding member 42 is of a shorter length than the arms or rail engaging members 38 and is arranged in a plane spaced vertically above the bottom sides 43 of the arms 38.

In the use of the jack of our invention the frame 10 is manipulated, through the handles 18, so as to position the arms 38 in a straddling relation or to opposite sides of a car wheel of a flanged type indicated at 44, with the rail ball section 40 received within the arm recesses 39 (Figs. 1 and 5). When in this position, the free end 46 of the wheel engaging member 42 overlies that section of the wheel flange 47 at the lower side of the car wheel 44.

To engage and lift the wheel truck, indicated generally as 48, our jack is equipped with an upright post or truck engaging member 49 carried on a base or saddle member 51, which is slidably supported on the top side of the stem 13 for adjustable movement longitudinally of the stem. The lower end of the post 49 is received within a socket member 52 rigidly connected with the base 51 for a purpose to appear later.

On the admission of air into the cylinder 21, to the top side of the piston 27, the piston rod 28 is moved downwardly so as to force the shoe 29 against the ground and lift the rear end of the frame 10 upwardly about the rail 41 as a fulcrum. As a result of this upward movement of the rear end of the frame 10 the truck 48 is engaged at its lower side 58 and moved upwardly by the post member 49. Concurrently with the raising of the truck 48 the free end portion 46 of the wheel holding member 42 is tilted downwardly into engagement with the wheel flange 47, as shown in Fig. 4, so as to restrain or hold the wheel 44 against upward movement with the truck 48. By virtue of this holding action on the wheel 44, the truck 48 is lifted from the wheel axle 50 with a reduced displacement of the piston rod 28 so as to more quickly release a brass 53 for removal purposes. Air is supplied to the cylinder from a source of air pressure (not shown) through a flexible conduit 54 fluid connected with the cylinder cover 22 through a control valve 56 mounted on the cover.

During the lifting of the rear end of the frame 10 about the rail 41 as a fulcrum longitudinal displacement of the arms 38 relative to the rail 41 is prevented due to the reception of the rail ball 40 within the recesses 39, and the pivoted support of the cylinder 22 on the frame 10. Thus as shown in Fig. 4, the walls or lips 57 at the forward ends of the recesses 39 are in abutting engagement with the rail ball 40, and with the cylinder 21 and piston rod 28 being retained in substantially upright positions during a lifting operation. To lower the rear end of the frame 10 it is only necessary to manipulate the valve member 56 to release the air from the top side of the piston 27.

In order to accommodate variations in the clearance relation between the ground and the bottom side 58 of the truck 48, truck engaging posts of different lengths may be used. For this purpose the frame 10, at the junction of the stem 13 with the branches 11 is equipped with a rack 59 (Figs. 1 and 2) for holding posts of varying lengths, with the selection of a post being such that when the frame 10 is in its position shown in Fig. 1, the upper end of the truck engaging post 49 is closely adjacent to the bottom side 58 of the truck 48.

Since the wheel flanges 47 may vary as to thickness, due to either wear or the initial design of a car wheel, an adaptor member 60 (Fig. 5) may be used in conjunction with the wheel holding arm 42. This member is comprised of a block 61 formed in one end with a longitudinally extended recess or pocket 62 of a size to fit over the front end portion 46 of the holding arm 42. The pocket 62 is in an off-center position in a direction laterally of the block 61 so that the side wall thereof indicated as 63 is of a greater thickness than its opposite side wall 64. Thus by merely reversing the position of the adaptor member 60 on the wheel holding arm 42 the clearance relation between the wheel flange 47 and the adaptor member 60 can be varied so that the flange engaging portion on the arm 42 is closely adjacent to the flange when the frame 10 is in its position shown in Fig. 1. Thus when the adaptor 60 is used one side or the other thereof is engageable with the wheel flange 47 depending upon the initial clearance relation between the arm 42 and the flange.

From a consideration of the above description it is seen that our invention provides a railway car jack which is of a simple and compact construction, and positive and speedy in operation to facilitate the inspection and removal of brass or wedges from the wheel truck of a railway car. The jack is positively maintained against displacement during a lifting operation, and the wheel holding member 42 acts concurrently with the truck engaging member 49 to accelerate the separation or movement of the wheel axle 50 relative to the truck 48. When a railway car is loaded our jack is used in the manner above described. However, it may be utilized in the lifting of empty railway cars, by merely positioning the arms or supports 38 between the adjacent wheels on a truck, such that the lifting post 49 is engageable with the projecting spring plate (not shown) forming part of a usual railway car truck.

Although our invention has been described and illustrated with respect to a preferred embodiment thereof, it is to be understood that it is not to be so limited since changes can be made therein which are within the full intended scope of our invention as defined by the appended claims.

We claim:

1. A jack for a railway car having a truck equipped with a wheel, said jack comprising a longitudinal frame, a pair of transversely spaced arms extended longitudinally outwardly from one end of said frame adapted to rest on a rail at opposite sides of a wheel, lift means at the opposite end of said frame for raising and lowering said opposite end relative to the one end of said frame, an upright projection adjacent said one end engageable with said truck to raise the same on upward movement of the opposite end of said frame, and means arranged on said frame between said arms and engageable with the wheel to hold the same against upward movement with the truck.

2. A jack for a railway car having a wheel truck comprising, a longitudinal frame member having one end portion of a substantially U-shape adapted to be positioned about a wheel with the legs thereof supported on a rail which constitutes a fulcrum for said frame, means for moving the other end of said frame up and down on said fulcrum, a truck engaging member on said frame for raising said truck in response to an upward movement of said frame, and a wheel engaging member intermediate said legs for holding the wheel against upward movement with the truck.

3. A jack for a railway car having a truck equipped with a flanged wheel comprising, a longitudinal frame terminating at one end in a pair of transversely spaced longitudinal arms adapted to straddle the wheel in supported positions on a rail, means for moving the opposite end of said frame up and down about the rail as a fulcrum, a truck engaging member on said frame for raising the truck in response to said upward movement of the frame and a wheel holding member on said frame extended longitudinally between said arms and engageable with the flange at the lower side of said wheel to hold the wheel against upward movement with the truck.

4. A jack for a railway car having a truck equipped with a flanged wheel comprising, a longitudinal frame having a transverse frame member at one end, a pair of transversely spaced arms on said transverse member extended longitudinally outwardly from said one end of the frame, said arms being positionable to opposite sides of the wheel with their free ends supported on the rail, means for moving the opposite end of said frame up and down about said rail as a fulcrum, a truck engaging member on said frame for raising the truck in response to said upward movement of the frame, and a third arm extended longitudinally outwardly from said one end of the frame intermediate said pair of arms, with said third arm being of a shorter length than said pair of arms and engageable with the flange at the lower side of said wheel to hold the wheel against upward movement with said truck.

5. A jack for a railway car having a truck equipped with a flanged wheel comprising, a longitudinal frame having a pair of transversely spaced longitudinal arms at one end adapted to straddle a wheel with their bottom sides in supported positions on a rail, means for moving the opposite end of said frame up and down about said rail as a fulcrum, an upright truck engaging member on said frame for raising the truck in response to said upward movement of the frame, an arm projected longitudinally between said pair of arms having a length less than that of said pair of arms and arranged in a plane spaced upwardly from the bottom sides of said pair of arms, and a portion on the free end of said projected arm engageable with the flange at the lower side of said wheel to hold the wheel against upward movement with said truck.

AUGUST W. MANDELKO.
MELVIN A. MANDELKO.

No references cited.